US012747688B1

(12) United States Patent
Patel et al.

(10) Patent No.: US 12,747,688 B1
(45) Date of Patent: Sep. 29, 2026

(54) EXHAUST VANE BRAKING STRATEGY FOR GASOLINE ENGINE WITH VARIABLE GEOMETRY TURBINE

(71) Applicant: FCA US LLC, Auburn Hills, MI (US)

(72) Inventors: Bindal Priteshkumar Patel, Auburn Hills, MI (US); Joseph Falcon, Auburn Hills, MI (US); William Attard, Auburn Hills, MI (US); Robbert De Bruijn, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 19/240,054

(22) Filed: Jun. 17, 2025

(51) Int. Cl.
*F02B 37/24* (2006.01)
*F02D 9/06* (2006.01)

(52) U.S. Cl.
CPC ................ *F02B 37/24* (2013.01); *F02D 9/06* (2013.01); *F02D 2250/34* (2013.01)

(58) Field of Classification Search
CPC .. F02B 37/22; F02B 37/24; F02D 9/04; F02D 9/06; F02D 41/0007; F02D 2250/34
See application file for complete search history.

(56) References Cited

U.S. PATENT DOCUMENTS

2003/0019470 A1* 1/2003 Anderson ........... F02D 41/1448 123/323
2010/0258080 A1* 10/2010 Andrasko ............... F02B 37/24 60/602
2015/0040859 A1* 2/2015 Scavone ............... F02D 41/145 123/323
2015/0292442 A1* 10/2015 Kostrzewski .......... F02M 26/05 60/601
2015/0354442 A1* 12/2015 Morelli ................. F02D 41/145 123/568.16
2021/0229668 A1* 7/2021 Jing .................. B60W 60/0025
2023/0139973 A1* 5/2023 Kurtz ...................... F02D 41/12 123/568.21

FOREIGN PATENT DOCUMENTS

CN 112832913 A * 5/2021 ............. F02D 29/02

* cited by examiner

*Primary Examiner* — Jonathan R Matthias
(74) *Attorney, Agent, or Firm* — Jeremy J. Klobucar

(57) ABSTRACT

A control system for a gasoline engine comprising a turbocharger having a compressor and a turbine includes a throttle, vanes on the turbine and a controller. The throttle moves between open and closed positions to permit air into an intake manifold of the engine. The vanes move between open and closed positions to control an amount of exhaust air that flows through the turbine. The controller controls a transition into vane braking and is configured to: determine whether fuel is shut off; determine whether a wheel speed exceeds a threshold; determine whether a brake pedal input exceeds a threshold; determine whether a speed of the gasoline engine satisfies a threshold; and command the transition into vane braking based on a determination that the fuel is shut off, a wheel speed exceeds a threshold, a brake pedal input exceeds a threshold, and a speed of the gasoline engine satisfies a threshold.

20 Claims, 10 Drawing Sheets

EXHAUST VANE BRAKING STRATEGY FOR GASOLINE ENGINE WITH VARIABLE GEOMETRY TURBINE

FIELD

The present application relates to exhaust vane braking on an internal combustion gasoline engine and, more particularly, to a control system that manages transitions into and out of exhaust vane braking while minimizing an amount of torque changes.

BACKGROUND

For an internal combustion gasoline engine, when a driver releases an accelerator pedal and wishes to coast-down, the engine must output negative torque to slow the vehicle down. Current strategies involve increasing pumping work by closing the throttle to a point that only allows a minimum amount of airflow through the engine. During this time, the engine shuts off fueling and pumps a minimum amount of air through the engine. This minimum airflow is determined through various hardware and system limits. As there is a minimal amount of air flowing into the manifold, this will decrease the manifold pressure. In normal conditions, closing the throttle will bring the manifold pressure down such as, but not limited to, around 15-20 kPa depending upon engine parameters. Meanwhile, the exhaust pressure will remain around 100 kPa (barometric). This difference in the intake manifold pressure and exhaust pressure is what generates most of the pumping losses within the engine. This pumping work directly relates to the negative torque output of the engine (engine braking).

As the automotive industry moves to downsize engines, the pumping work of these smaller engines also decreases. This can cause the engine brake torque capability to decrease as well. In this case, the vehicle will not coast-down as aggressively as needed. This will force the drivers to use the friction brakes more, which is undesirable. Accordingly, a need exists in the art to improve upon braking solutions for vehicles that incorporate gasoline engines.

SUMMARY

According to one example aspect of the invention, a control system for a gasoline engine comprising a turbocharger having a compressor and a turbine includes a throttle, vanes on the turbine, at least one cam, and a controller. The throttle moves between open and closed positions to permit air into an intake manifold of the engine. The vanes move between open and closed positions by a vane actuator to control an amount of exhaust air that flows through the turbine. The cam that rotates causing a valve to open and allow an amount of air to flow through the engine, the at least one cam having a cam actuator that impacts the rotation of the at least one cam. The controller controls a transition into vane braking and is configured to: determine whether fuel is shut off; determine whether a wheel speed exceeds a threshold; determine whether a brake pedal input exceeds a threshold; determine whether a speed of the gasoline engine satisfies a threshold; and command the transition into vane braking based on a determination that the fuel is shut off, a wheel speed exceeds a threshold, a brake pedal input exceeds a threshold, and a speed of the gasoline engine satisfies a threshold.

In some implementations, the controller is further configured to: determine whether there are not any actuator faults; and command the transition into vane braking based on a determination that there are not any actuator faults.

In additional features, the actuator faults comprise a fault from at least one of an oil pressure sensor, a manifold air pressure sensor, a throttle, a variable geometry turbine, an intake/exhaust cam.

In other implementations, the controller is further configured to: determine whether an engine coolant temperature is within a threshold; and command the transition into vane braking based on a determination that engine coolant temperature is within a threshold.

In additional implementations, the controller is configured to: determine whether an engine oil temperature is within a threshold; and command the transition into vane braking based on a determination that engine oil temperature is within a threshold.

In other features, the controller is further configured to: determine whether a transmission shift is in process; and command the transition into vane braking based on a determination that a transmission shift is not in progress.

According to another example aspect of the invention, a method of controlling vane braking on an internal combustion engine is provided. The gasoline engine has a turbocharger including a compressor and a turbine, the engine further having: a throttle that moves between open and closed positions to permit air into an intake manifold of the engine; vanes provided on the turbine that move between open and closed positions by a vane actuator to control an amount of exhaust air that flows through the turbine; at least one cam that rotates causing a valve to open and allow an amount of air to flow through the engine, the at least one cam having a cam actuator that impacts the rotation of the at least one cam; and a controller that controls a transition into vane braking. The method comprises: determining, at the controller, whether fuel is shut off; determining, at the controller, whether a wheel speed exceeds a threshold; determining, at the controller, whether a brake pedal input exceeds a threshold; determining, at the controller, whether a speed of the gasoline engine satisfies a threshold; and commanding, at the controller, the transition into vane braking based on a determination that the fuel is shut off, a wheel speed exceeds a threshold, a brake pedal input exceeds a threshold, and a speed of the gasoline engine satisfies a threshold.

In some implementations, the method further includes: determining, at the controller, whether there are not any actuator faults; and commanding, at the controller, the transition into vane braking based on a determination that there are not any actuator faults.

In additional features of the method, the actuator faults comprise a fault from at least one of an oil pressure sensor, a manifold air pressure sensor, a throttle, a variable geometry turbine, and an intake/exhaust cam.

In some implementations, the method includes: determining, at the controller, whether an engine coolant temperature is within a threshold; and commanding, at the controller, the transition into vane braking based on a determination that engine coolant temperature is within a threshold.

In other implementations, the method includes: determining, at the controller, whether an engine oil temperature is within a threshold; and commanding, at the controller, the transition into vane braking based on a determination that engine oil temperature is within a threshold.

In additional implementations, the method includes: determining, at the controller, whether a transmission shift is in process; and commanding, at the controller, the transition into vane braking based on a determination that a transmission shift is not in progress.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 1:
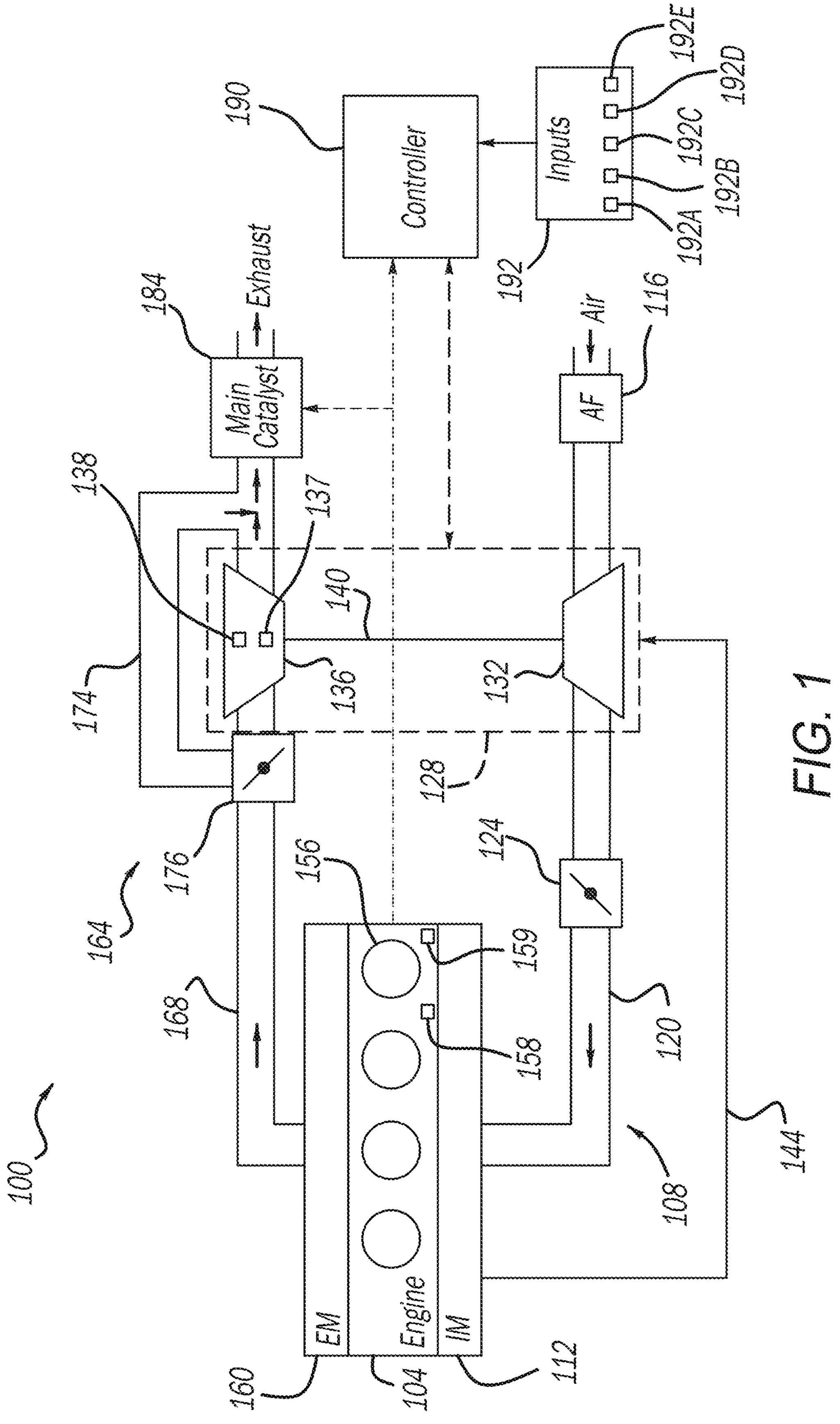
FIG. 1 is a diagram of an example vehicle comprising a turbocharged engine and incorporating a control system that manages transitions into and out of exhaust vane braking while minimizing an amount of torque changes according to the principles of the present disclosure.

A variable geometry turbine (VGT) includes adjustable vanes within the turbine housing to control the flow through the turbine. At higher RPM's, when the vanes are fully open, the air can flow through the turbine normally. Conversely, at lower RPM's, the vanes are adjusted to create more boost by angling the flow to the blades. If the hardware is designed appropriately, the vanes can be closed far enough that it will create a very tight space for the air to flow through. In this case, the air flow will be restricted, causing an increase in exhaust backpressure.

Vane braking involves opening the throttle and closing the VGT vanes to generate negative torque during a vehicle coast-down. This restricts the flow creating exhaust back pressure, which leads to more pumping work than a standard engine. Exhaust vane braking has not been incorporated for a gasoline engine in part because the coordination of all the airflow actuators can cause an undesirable jump in torque during the transition into and out of exhaust vane braking. In this regard, the available pumping work out of a conventional engine braking system is the maximum pumping capability. Diesel applications have an exhaust braking feature to increase brake torque capability, but the actuator strategy is different as they do not have an intake throttle. Diesel applications close and actively control the variable geometry turbine vanes to manage airflow based on the required torque output. As there has not been a gasoline application, there has also not been a transition or torque control strategy involving a throttle.

The present disclosure is directed toward a system and method for transitioning into and out of an exhaust vane braking mode. The exhaust vane braking mode is used to generate more brake torque, while minimizing other unnecessary torque jumps. Vane braking is activated based on a number of enable conditions being satisfied including: fuel shut off; no accelerator pedal input (vehicle is coasting); vehicle is accelerating faster than a limit for a given amount of engine braking; brake pedal input confirmed; engine revolutions per minute (RPM) is above a minimum RPM threshold and below a maximum RPM threshold; no active actuator faults (such as throttle, turbine, variable geometry turbo (VGT), intake/exhaust cams, manifold air pressure (MAP) sensor, oil pressure sensor); engine coolant temperature is above a threshold; engine oil temperature is above a threshold; no transmission shifting in process during vane braking transitioning.

In advantages, the control method disclosure herein for enabling and disabling exhaust vane braking does not need the driver to actively provide an input (e.g., press a button) to activate vane braking. Instead, the control strategy looks at parameters that are already captured by the engine and determines whether additional brake torque is needed at that time. Unnecessary activation of exhaust vane braking that can lead to driver discomfort (unintended increase in brake torque) is prevented.

Exhaust vane braking increases the pumping work compared to conventional fuel shut off engine braking. When there is a higher negative torque output required from the engine, instead of closing the throttle and opening the VGT vanes, the throttle is opened and the VGT vanes are closed. This allows high air flow through the throttle, and the manifold pressure would be at barometric or above (if the compressor is generating boost). On the other hand, the closed vanes will increase the exhaust back pressure to around 300 kPa at higher RPM's. This difference in intake and exhaust pressure is much greater than conventional engine braking with the throttle closed. Additionally, cam phasers are used to change the intake valve and exhaust valve opening and closing times to allow maximum amount of air to flow through the engine (maximum volumetric efficiency cams). All of this combined will increase pumping work for the engine, in turn, producing a larger negative torque output.

The present disclosure provides a method to smoothly transition into and out of exhaust vane braking while minimizing the amount of torque changes (torque jumps). A current fuel shut-off engine braking strategy is to close the throttle, open the VGT vanes, and have some fixed cam positions. As more engine braking is required, the engine controller will need to reposition these actuators to begin exhaust vane braking. Since the throttle is already closed, and minimum air is flowing through the engine, moving the cams and the VGT vanes will not cause a large torque change. In a first step, the VGT vanes are closed and the cams are moved to VE cams. Once these actuators are in the desired locations, the throttle will start to open slowly. The slow transition of the throttle is important, since quickly actuating the throttle open can cause an unpleasant torque jump. Next, the throttle is adjusted (part throttle to fully open throttle) to control the amount of airflow through the system. This can help actively control the pumping work/torque output of the engine.

When it is desirable to exit this feature, the manifold will need to be depleted to avoid any large torque jumps during refueling. This is achieved by slowly closing the throttle to deplete the manifold and lowering the airflow through the system. At this point, the other actuators can be set to where they were before entering this feature (open VGT vanes, move cams back to previously fixed position). This actuator coordination and transition strategy allows exhaust vane braking to provide the maximum amount of brake torque while avoiding any unnecessary torque jumps. While the following discussion is in the context of an internal combustion engine, the concepts can be used on any combustion mode, diesel or mixed mode combustion.

Referring now to FIG. 1, a diagram of an example vehicle or vehicle control system 100 is illustrated. The vehicle 100 includes an engine 104 configured to combust an air/fuel mixture to generate drive torque. The engine 104 includes an intake system 108 that draws fresh air into an intake manifold (IM) 112 through an air filter (AF) 116 and an induction passage 120. A throttle valve 124 regulates a flow of air through the induction passage 120. A turbocharger 128 comprises a compressor 132 (e.g., a centrifugal compressor) that pressurizes or forces the air through the induction passage 120. The compressor 132 is coupled to a turbine 136 (e.g., a variable geometry turbine) of the turbocharger 136 via a shaft 140. The turbine 136 includes vanes 137 that are actuated between open and closed positions by a vane actuator 138.

The pressurized air is distributed to a plurality of cylinders 156 and combined with fuel (e.g., from respective direct-injection or port-injection fuel injectors) to form an air/fuel mixture. The engine 104 includes a valvetrain having a series of intake and exhaust rocker arm valve assemblies. The intake and exhaust rocker arm assemblies rotate based on interaction with intake and exhaust camshafts, collectively identified as camshafts 158. The intake and exhaust rocker arm assemblies open and close intake and exhaust valves on the engine 104. An actuator 159 can alter cam positioning to achieve desired levels of open and closed. In the example provided, the camshafts 158 and actuator 159 can comprise cam phasers that are used to change the intake valve and exhaust valve opening and closing times to allow for maximum amount of air to flow through the engine 104, also referred to herein as maximum volumetric efficiency (VE) cams. Other hardware is contemplated for altering a timing of the cams within the scope of the present disclosure.

While four cylinders are shown, it will be appreciated that the engine 104 could include any number of cylinders. The air/fuel mixture is compressed by pistons (not shown) within the cylinders 156 and combusted (e.g., via spark from respective spark plugs) to drive the pistons, which turn a crankshaft (not shown) to generate drive torque. The drive torque is then transferred to a driveline (not shown) of the vehicle 100, e.g., via a transmission (not shown). Exhaust gas resulting from combustion is expelled from the cylinders 156 and into an exhaust manifold (EM) 160 of the engine 104.

The exhaust gas from the exhaust manifold 160 is provided to an exhaust system 164 comprising an exhaust passage 168. Kinetic energy of the exhaust gas drives the turbine 136, which in turn drives the compressor 132 via the shaft 140. A bypass passage 174 can route exhaust air around the turbine 136 based on a position of a valve 176. The valve 176 moves between a fully open position whereby all exhaust gas is routed to the turbine 136, a fully closed position whereby all exhaust gas is routed through the bypass passage 174, and infinite positions therebetween. A main exhaust gas treatment system 184, such as a catalytic converter, treats exhaust gas to decrease or eliminate emissions before it is released into the atmosphere. All exhaust gas regardless of passing through the turbine 136 or the bypass passage 174 is directed to the main exhaust gas treatment system 184.

Lubrication oil from the engine 104 is routed through an oil line 144 to the turbocharger 128 to lubricate components of the turbocharger 128. In examples, the oil is sourced from the engine 104 at the sump.

A controller, also referred to herein as an engine controller, 190 controls operation of the vehicle 100. Examples of components controlled by the controller 190 include the engine 104, the throttle valve 124, the vane actuator 138 and the cam actuator 159. It will be appreciated that the controller 190 controls specific components of the vehicle 100 that are not illustrated, such as, but not limited to, fuel injectors, spark plugs, an EGR valve, a VVC system (e.g., intake/exhaust valve lift/actuation), a transmission, and the like. The controller 190 controls operation of these various components based on measured and/or modeled parameters. Inputs 192 such as one or more sensors are configured to measure one or more parameters, and communicate signals indicative thereof to the controller 190 (such as from an accelerator pedal 192A, a brake pedal 192B, a wheel speed sensor 192C, an engine speed sensor 192D and a transmission shift input 192E) as discussed in greater detail herein. Other parameters could be modeled by the controller 190, e.g., based on other measured parameters. The controller 190 is also configured to perform the engine/turbocharger control techniques.

Figure 2:
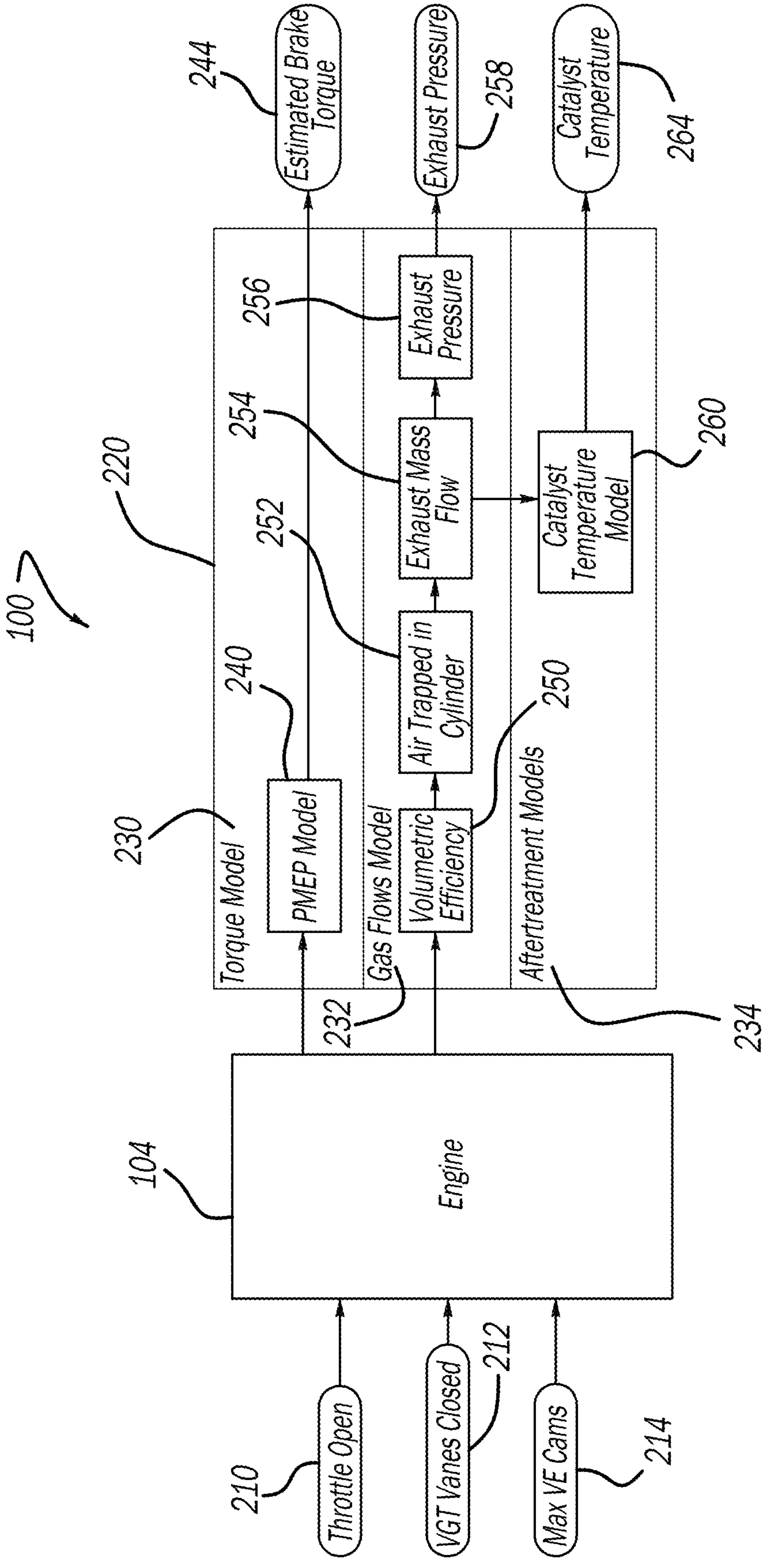
FIG. 2 is a system overview that implements the control system of FIG. 1 according to examples of the present disclosure.

Turning now to FIG. 2, the control system 100 FIG. 1 will be further described. The engine 104 receives a throttle open input 210, a VGT vanes closed input 212 and a maximum VE cams input 214. A models implementation module 220 includes a torque model 230, a gas flows model 232 and an aftertreatment model 234. The torque model 230 includes a pumping mean effective pressure (PMEP) model 240 that outputs an estimated brake torque 244. The gas flows model 232 includes a volumetric efficiency module 250 that determines a volumetric efficiency, an air trapped in cylinder module 252 that determines a volume of air trapped in the cylinder, an exhaust mass flow module 254 that determines an exhaust mass flow, and an exhaust pressure module 256 that determines an exhaust pressure. The pressure drop due to the turbine 136 is a function of RPM and exhaust mass flow. The exhaust mass flow needs to be corrected to get a correct upstream turbine total pressure (exhaust pressure which impacts the PMEP). Exhaust flow is a function of the amount of air mass trapped in the cylinder. The amount of air mass trapped in the cylinder is a function of the VE estimation model. Therefore, the VE model is corrected to get the correct exhaust pressure estimation. The gas flows model 232 outputs an exhaust pressure 258. As used herein, the term "module" can mean a model or other part of the controller 190.

The aftertreatment models 234 includes a catalyst temperature model 260 that outputs a catalyst temperature 264. The catalyst temperature model 260 assumes a steady state temperature that the catalyst will reach during fuel shut-off. It also calculates a filter factor based on the air mass flow rate through the catalyst. This filter models how slowly the temperature will change to get to that steady state estimation. With vane braking, the change is the overall system (positions of the actuators 138, 159) will change the mass flow rate and change how the catalyst cools down. This change is corrected in the catalyst temperature model.

Figure 3:
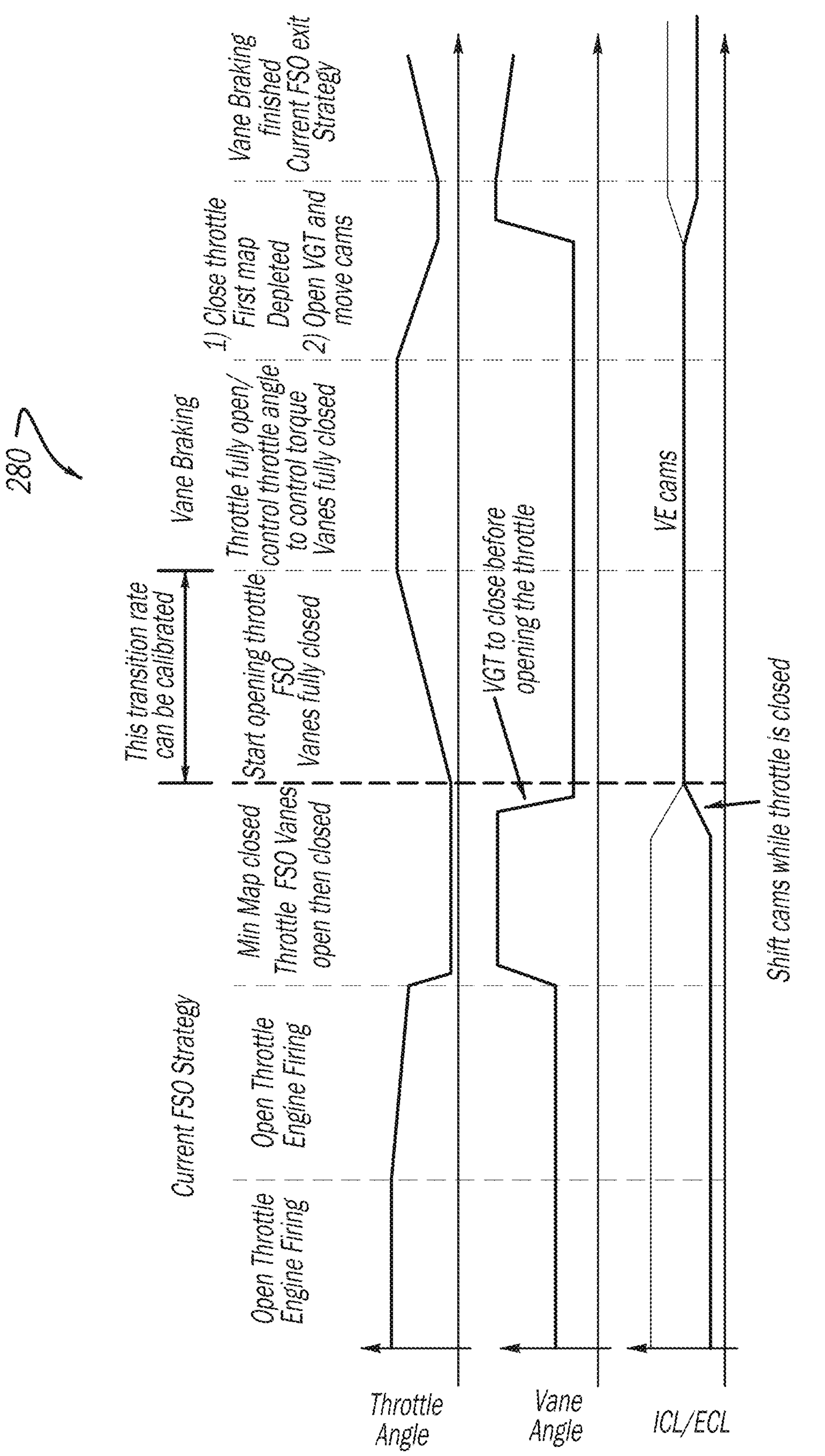
FIG. 3 is a plot illustrating throttle angle, vane angle, intake/exhaust centerline positions while implementing the vane braking techniques according to examples of the present disclosure.

FIG. 3 is a plot 280 illustrating throttle angle, vane angle, intake/exhaust centerline positions while implementing the vane braking techniques according to examples of the present disclosure.

Figure 4:
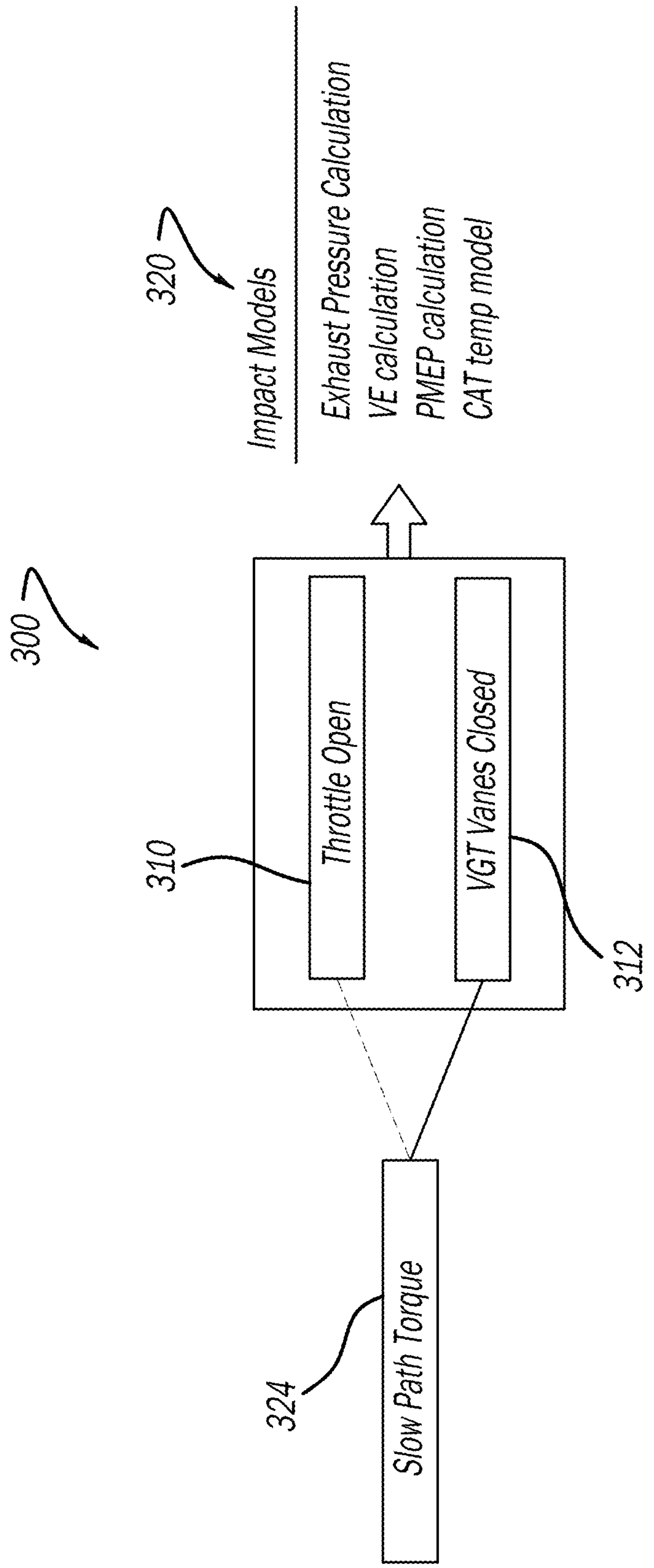
FIG. 4 is a diagram illustrating throttle open and VGT vanes closed targets and their impact on models according to examples of the present disclosure.

FIG. 4 is a diagram 300 illustrating a throttle open target 310 and a VGT vanes closed target 312 and their impact on models 320 according to examples of the present disclosure. The present disclosure corrects the existing controls models that have been impacted by the changes made by the vane braking. The torque model is impacted due to the increase in exhaust pressure. This change in torque must be corrected based on a pressure ratio (manifold pressure/barometric) and an RPM of the engine 104. The exhaust pressure model is corrected by correcting the exhaust mass air flow. The exhaust mass flow is a function of the amount of air that is trapped in the cylinder, which is a function of the volumetric efficiency. A similar correction surface must be calibrated to correct the volumetric efficiency based on a pressure ratio (manifold pressure/barometric) and an RPM of the engine 104.

A slow path torque 324 provides inputs to the targets 310, 312. As noted above, entering exhaust vane braking will restrict the air flow through the VGT 136 causing the exhaust back pressure to build up. This increase in back pressure will change the pumping work, which will in turn change the brake torque. In prior art techniques, the torque model 230 is not expecting a large exhaust pressure during fuel shut off engine braking. The present disclosure corrects this by adding the PMEP model 240 when operating in exhaust vane braking. This correction surface will be a function of the amount of air coming into the engine 104, as this can change the final exhaust pressure. One way to correlate the amount of air in the engine 104 is based on the pressure ratio (manifold pressure/barometric pressure) and the engine speed. This PMEP correction term provided by the PMEP model 240 will be a function of pressure ratio and engine speed and results in an estimated brake torque 244.

With the VGT vanes 137 closed, the exhaust pressure will increase significantly compared to a conventional engine braking. This increase in pressure needs to be captured in the gas flows model 232. The exhaust pressure (upstream of the turbine 136) is estimated by calculating the upstream catalyst pressure (barometric pressure minus drop in pressure through the catalyst 184. After which a drop in pressure across the turbine 136 is subtracted from downstream turbine pressure to finally get upstream turbine pressure (exhaust pressure). This drop in pressure across the turbine 136 is a function of the air mass flow. This drop in pressure calculation needs to be corrected to estimate a correct upstream turbine pressure.

The correction provided by the gas flows model 232 will now be described in more detail. The air flow through the engine 104 impacts the exhaust pressure calculation and since the air flow will be largely impacted by the vane braking disclosed herein, it needs to be corrected. Exhaust mass flow is calculated by estimating the amount of air mass trapped in the cylinder. This air mass trapped comes from volumetric efficiency calculations There is a correction to the volumetric efficiency model 250 to correct the downstream models discussed above. This correction will similarly be a function of the pressure ratio (manifold pressure/barometric pressure) and the speed of the engine 104.

The correction provided by the aftertreatment models 234 will now be described in greater detail. The catalyst temperature model assumes a steady state temperature that the catalyst 184 will reach during fuel shut off. It also calculates a filter factor based on the air mass flow rate through the catalyst. The filter models how slowly the temperature will change to get to that steady state estimation. With vane braking, the change in the overall system (specifically the positions of the actuators 138 and 159) will change the mass flow rate and change how the catalyst cools down. This change is corrected in the catalyst temperature model 260.

Figure 5:
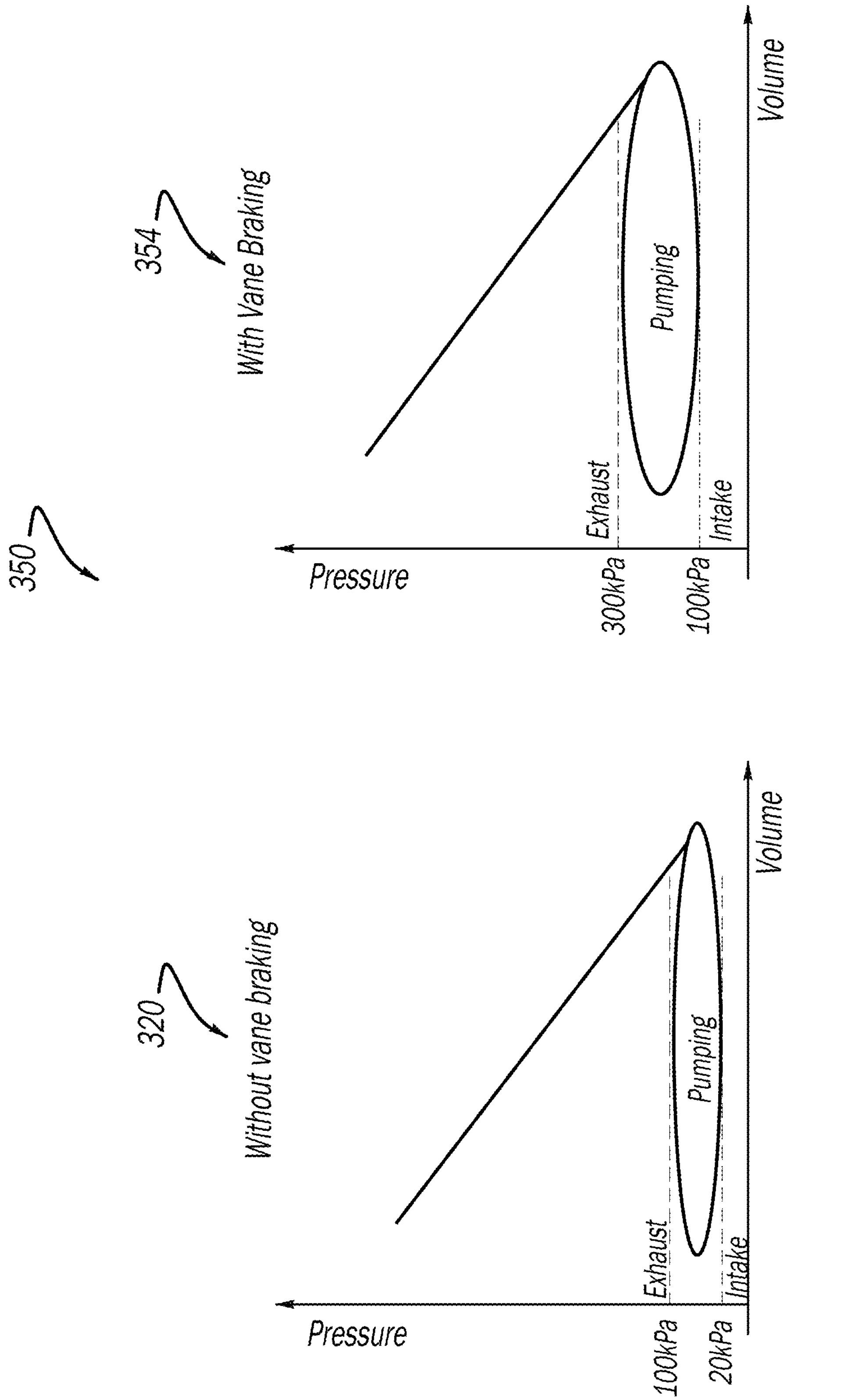
FIG. 5 illustrates brake torque comparisons without vane braking versus with vane braking according to examples of the present disclosure.

FIG. 5 illustrates brake torque comparisons 350 including pumping pressure without vane braking 352 versus pumping pressure with vane braking 354 according to examples of the present disclosure. The change in the exhaust backpressure will change the pumping work. As the brake torque is directly related to the pumping work, there needs to be a correction to the torque model 230 (FIG. 2).

Figure 6:
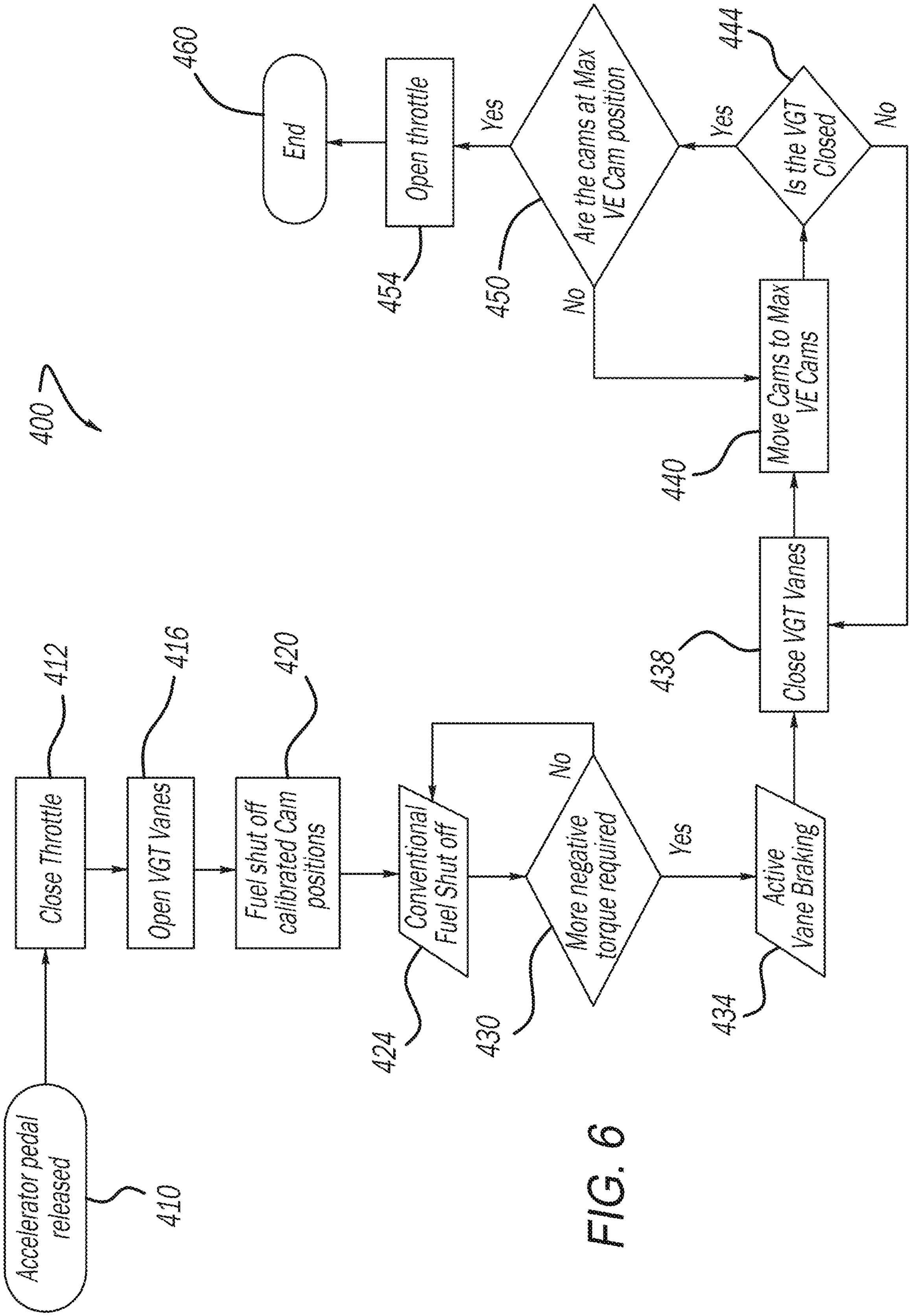
FIG. 6 is a flow diagram illustrating a control strategy for entering vane braking according to examples of the present disclosure.

FIG. 6 is a flow diagram illustrating a control method 400 for entering vane braking according to examples of the present disclosure. At 410, control determines, based on inputs 192, that the accelerator pedal has been released. At 412 the throttle 124 is closed. At 416, the VGT vanes 137 are opened (e.g., by commanding the vane actuator 138 to open the vanes 137). At 420, the fuel is shut off at calibrated cam positions. At 424 control commands a conventional fuel shut off. At 430 control determines whether more negative torque is required. If more negative torque is not required, control loops to 424. If more negative torque is required, control activates vane braking at 434. At 438 control closes the VGT vanes (e.g., by commanding the vane actuator 138 to actuate the vanes 137 to the closed position). At 440, control commands the cams 158 to the maximum VE cam position (e.g., by commanding the actuator 159). At 444, control determines whether the VGT is closed. If control determines that the VGT is not closed, control loops to 438. If control determines that the VGT is closed at 444, control determines whether the cams 158 are at the maximum VE cam position at 450. In examples, the cams 158 can include the intake cams, however in some examples, the intake and exhaust cams can be used based on operating conditions. If control determines that the cams 158 are not at the maximum VE cam position at 450, control loops to 440. If control determines that the cams 158 are at the maximum VE cam position at 450, control opens the throttle 124 at 454. Control ends at 460.

Figure 7:
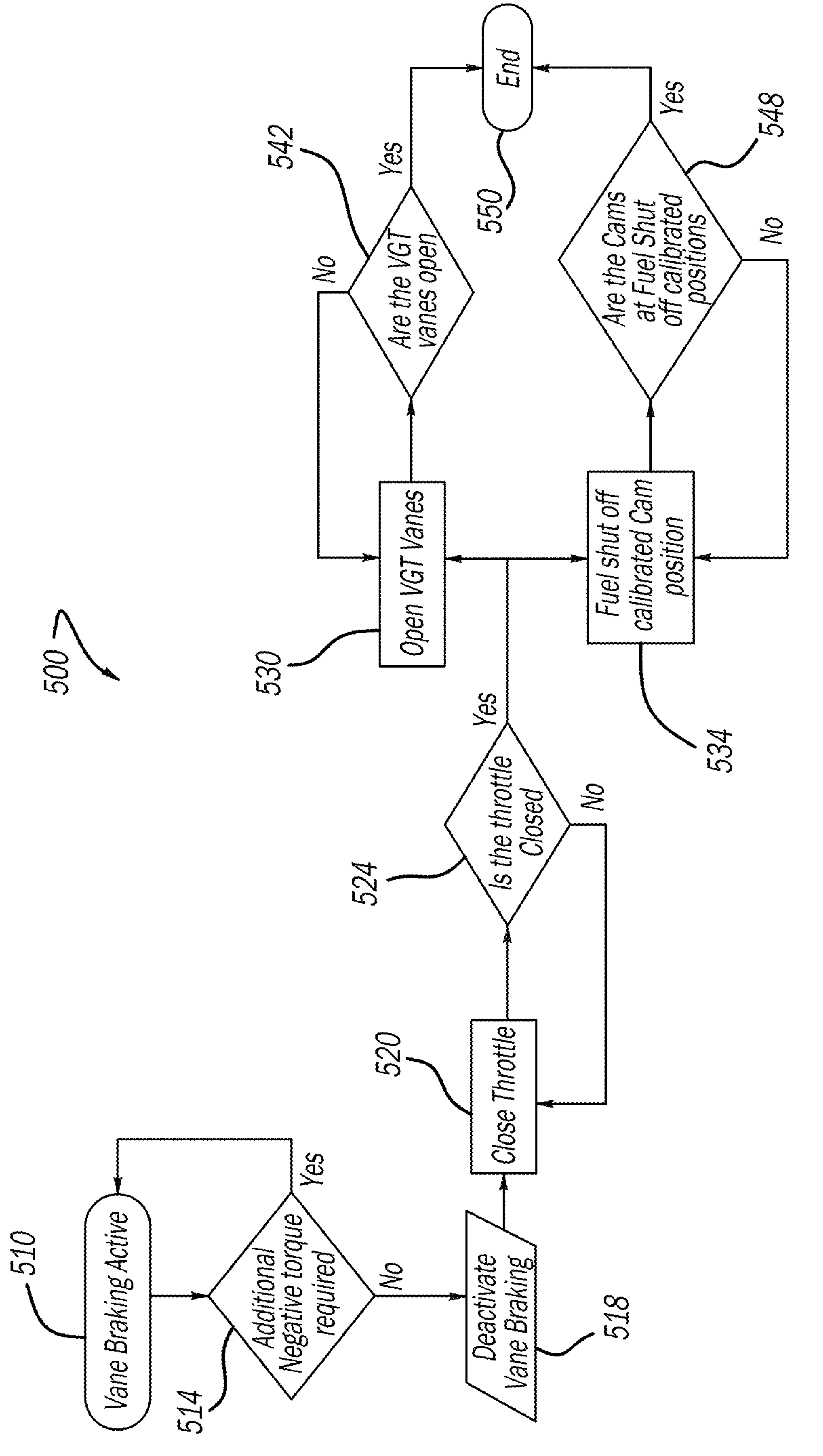
FIG. 7 is another flow diagram illustrating a control strategy for exiting vane braking according to examples of the present disclosure.

FIG. 7 is a flow diagram illustrating a control method 500 for exiting vane braking according to examples of the present disclosure. At 510 control determines that vane braking is active. At 514 control determines whether additional negative torque is required. If control determines that additional negative torque is required at 514, control loops to 510. If control determines that additional negative torque is not required at 514, control deactivates vane braking at 518. At 520, control closes the throttle 124. At 530 control opens the VGT vanes 137. At 534 control commands fuel shut off at calibrated cam positions. At 542 control determines whether the VGT vanes 137 are open. If control determines that the VGT vanes 137 are not open, control loops to 530. If control determines that the VGT vanes 137 are open, control ends at 550. At 548, control determines whether the cams 158 are at fuel shut off calibrated positions. If control determines that the cams 158 are not at the fuel shut off calibrated positions, control loops to 534. If control determines that the cams are at fuel shut off calibrated positions at 548, control ends at 550.

Figure 8A:
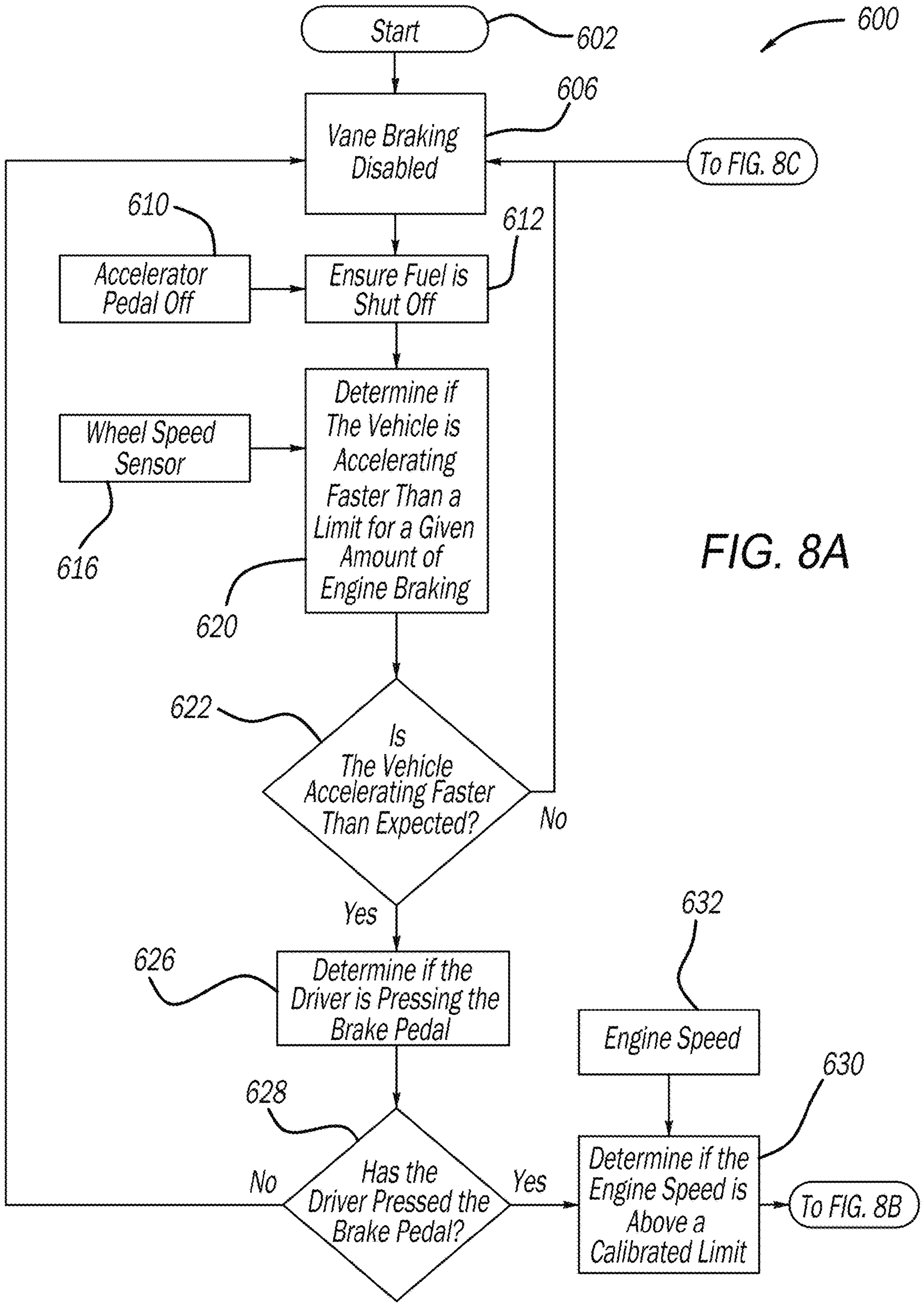
FIGS. 8A-8C is a flow diagram illustrating another control strategy for enabling and disabling exhaust vane braking according to examples of the present disclosure.
Figure 8B:
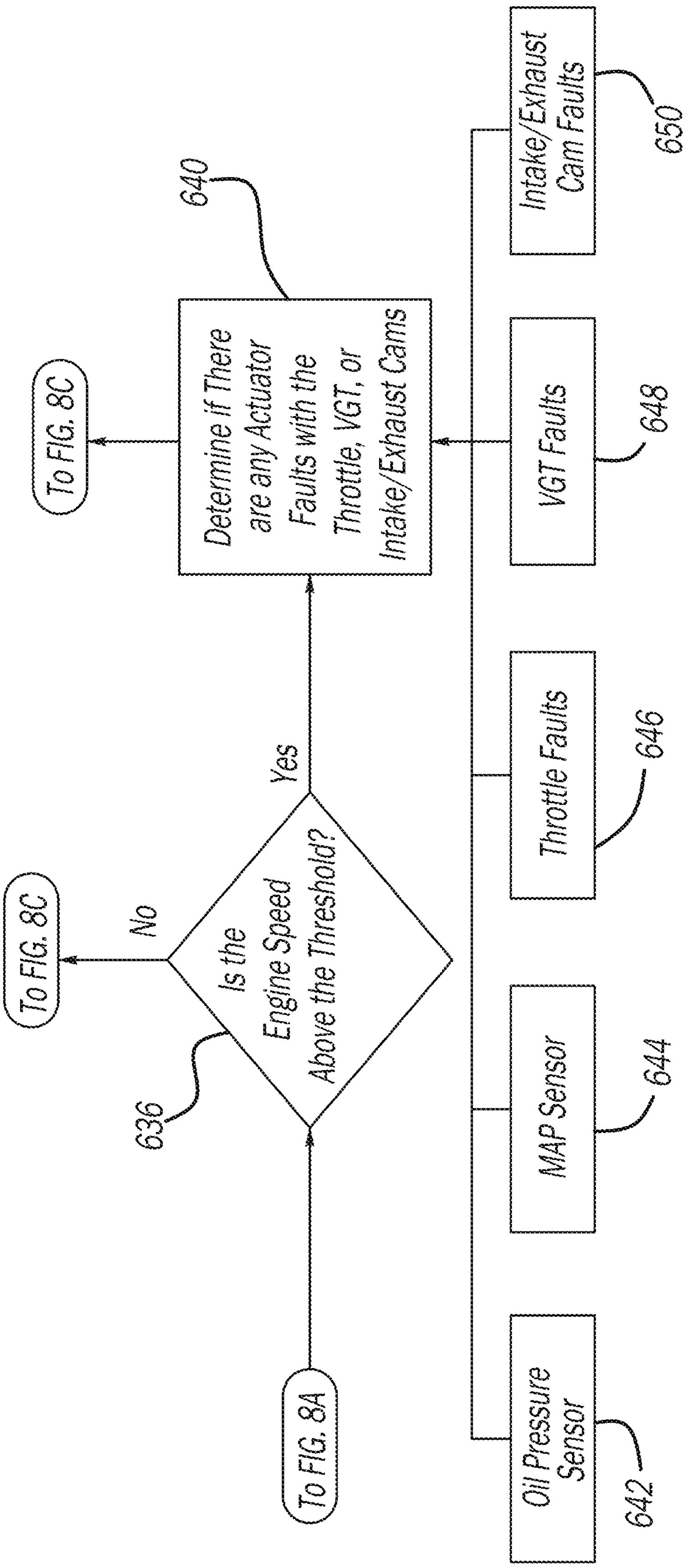
Figure 8C:
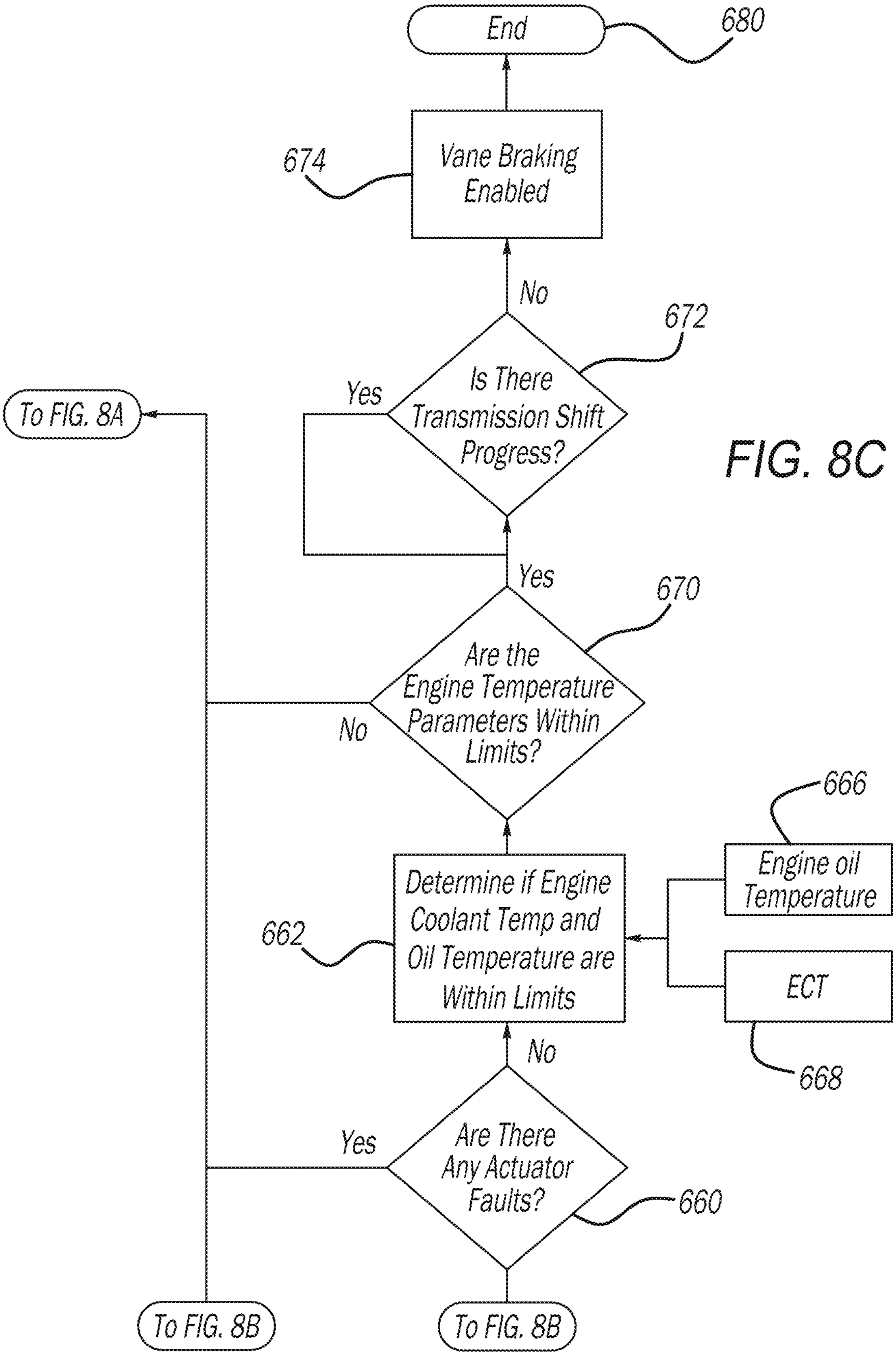

With additional reference now to FIGS. 8A-8C, is a flow diagram illustrating another control method 600 for enabling and disabling exhaust vane braking according to examples of the present disclosure will be described. At 602 control starts. At 606 control confirms vane braking is disabled. At 612 control determines fuel is shut off 612 and accelerator pedal 192A is off from the inputs 192. At 620, control determines if the vehicle 100 is accelerating faster than a limit for a given amount of engine braking based on a wheel speed sensor 192E input 192. At 622 control determines whether the vehicle 100 is accelerating faster than expected. If the vehicle is not accelerating faster than expected, control loops to 606. If the vehicle is accelerating faster than expected, control determines if the brake pedal 192B is providing an input from inputs 192. At 628 control determines if there is a brake pedal input. If not, control loops to 606. If control determines that the brake pedal 192B is providing an input, control determines if the engine speed 192D (from inputs 192) is above a calibrated limit. At 636 control determines if the engine speed 192D is above a threshold. If the engine speed 192D is not above a threshold, control loops to 606.

If control determines that the engine speed 192D is above a threshold, control determines whether there are any actuator faults with the throttle, VGT or intake/exhaust cams based on inputs from the oil pressure sensor 642, the MAP sensor 644, throttle faults 646, VGT faults 648 and intake/exhaust cam faults 650. At 660 control determines if there are any actuator faults. If control determines that there are faults, control loops to 606. If control determines that there are not any faults, control determines if the engine coolant temperature and oil temperature are within limits at 662 based on an engine oil temperature 666 and an engine coolant temperature input 668 from the inputs 192. At 670 control determines if the engine temperature parameters are within limits. If control determines that the engine temperature parameters are not within limits at 670, control loops to 606. If control determines that the engine temperature parameters are within limits at 670, control determines, from inputs 192, if there is a transmission shift 192E in progress from inputs 192. If control determines that a transmission shift 192E is in progress at 672, control loops to 606. If control determines that a transmission shift 192E is not in progress at 672, control enables vane braking at 674. Control ends at 680.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A control system for a gasoline engine comprising a turbocharger having a compressor and a turbine, the system comprising:
- a throttle that moves between open and closed positions to permit air into an intake manifold of the engine;
- vanes provided on the turbine that move between open and closed positions by a vane actuator to control an amount of exhaust air that flows through the turbine;
- at least one cam that rotates causing a valve to open and allow an amount of air to flow through the engine, the at least one cam having a cam actuator that impacts the rotation of the at least one cam; and
- a controller that controls a transition into vane braking, the controller configured to:
  - determine whether fuel is shut off;
  - determine whether the vehicle is accelerating faster than a limit for a given amount of engine braking based on a wheel speed sensor input;
  - determine whether a brake pedal input exceeds a threshold;
  - determine whether a speed of the gasoline engine satisfies a threshold; and
  - command the transition into vane braking based on a determination that the fuel is shut off, the vehicle is accelerating faster than the limit for the given amount of engine braking, a brake pedal input exceeds a threshold, and a speed of the gasoline engine satisfies a threshold.

2. The control system of claim 1, wherein the controller is further configured to:
- determine whether there are not any actuator faults; and
- command the transition into vane braking based on a determination that there are not any actuator faults.

3. The control system of claim 2, wherein the actuator faults comprise a fault from at least one of an oil pressure sensor, a manifold air pressure sensor, a throttle, a variable geometry turbine, an intake/exhaust cam.

4. The control system of claim 2, wherein the controller is further configured to:
- determine whether an engine coolant temperature is within a threshold; and
- command the transition into vane braking based on a determination that engine coolant temperature is within a threshold.

5. The control system of claim 4, wherein the controller is further configured to:
- determine whether an engine oil temperature is within a threshold; and
- command the transition into vane braking based on a determination that engine oil temperature is within a threshold.

6. The control system of claim 4, wherein the controller is further configured to:
- determine whether a transmission shift is in process; and
- command the transition into vane braking based on a determination that a transmission shift is not in progress.

7. The control system of claim 1, wherein the controller is further configured to:
- command the vane actuator to close the vanes; command the cam actuator to move the at least one cam to a maximum volumetric efficiency cam position; and
- command the throttle to open only after determining that the vanes are closed and the at least one cam is at the maximum volumetric efficiency cam position.

8. The control system of claim 7, wherein the controller is further configured to open the throttle at a calibrated rate to avoid a torque jump during the transition into vane braking.

9. The control system of claim 1, wherein the controller is further configured to:

command the throttle to a partially open position to a fully open position to control an amount of airflow through the gasoline engine during vane braking, thereby actively controlling a pumping work and a torque output of the gasoline engine.

10. The control system of claim 1, wherein the controller is further configured to control a transition out of vane braking by:

determining that additional negative torque is no longer required; commanding the throttle to close to deplete the intake manifold; commanding the vane actuator to open the vanes; and commanding the cam actuator to return the at least one cam to a fuel shut-off calibrated position.

11. The control system of claim 1, wherein the controller is further configured to:

determine, based on the wheel speed, whether the vehicle is accelerating faster than a predetermined limit for a given amount of conventional fuel shut-off engine braking; and command the transition into vane braking only when the vehicle is accelerating faster than the predetermined limit.

12. The control system of claim 1, wherein the controller is further configured to:

correct a pumping mean effective pressure model based on a pressure ratio of intake manifold pressure to barometric pressure and a speed of the gasoline engine during vane braking to generate an estimated brake torque.

13. The control system of claim 1, wherein the controller is further configured to:

correct a volumetric efficiency model based on a pressure ratio of intake manifold pressure to barometric pressure and a speed of the gasoline engine during vane braking to determine an exhaust mass flow and an exhaust pressure upstream of the turbine.

14. The control system of claim 1, wherein the at least one cam comprises an intake cam phaser and an exhaust cam phaser, and wherein the controller commands both the intake cam phaser and the exhaust cam phaser to a maximum volumetric efficiency position during vane braking to maximize an amount of air flowing through the gasoline engine.

15. A method of controlling vane braking on a gasoline engine having a turbocharger including a compressor and a turbine, the engine further having: a throttle that moves between open and closed positions to permit air into an intake manifold of the engine; vanes provided on the turbine that move between open and closed positions by a vane actuator to control an amount of exhaust air that flows through the turbine; at least one cam that rotates causing a valve to open and allow an amount of air to flow through the engine, the at least one cam having a cam actuator that impacts the rotation of the at least one cam; and a controller that controls a transition into vane braking, the method comprising:

determining, at the controller, whether fuel is shut off;

determining, at the controller, whether the vehicle is accelerating faster than a limit for a given amount of engine braking based on a wheel speed sensor input;

determining, at the controller, whether a brake pedal input exceeds a threshold;

determining, at the controller, whether a speed of the gasoline engine satisfies a threshold; and commanding, at the controller, the transition into vane braking based on a determination that the fuel is shut off, the vehicle is accelerating faster than the limit for the given amount of engine braking, a brake pedal input exceeds a threshold, and a speed of the gasoline engine satisfies a threshold.

16. The method of claim 15, further comprising:

determining, at the controller, whether there are not any actuator faults; and commanding, at the controller, the transition into vane braking based on a determination that there are not any actuator faults.

17. The method of claim 16, wherein the actuator faults comprise a fault from at least one of an oil pressure sensor, a manifold air pressure sensor, a throttle, a variable geometry turbine, an intake/exhaust cam.

18. The method of claim 16, further comprising:

determining, at the controller, whether an engine coolant temperature is within a threshold; and commanding, at the controller, the transition into vane braking based on a determination that engine coolant temperature is within a threshold.

19. The method of claim 18, further comprising:

determining, at the controller, whether an engine oil temperature is within a threshold; and commanding, at the controller, the transition into vane braking based on a determination that engine oil temperature is within a threshold.

20. The method of claim 18, further comprising:

determining, at the controller, whether a transmission shift is in process; and commanding, at the controller, the transition into vane braking based on a determination that a transmission shift is not in progress.

* * * * *